Patented Aug. 11, 1931

1,818,360

UNITED STATES PATENT OFFICE

JOHN H. SCHMIDT, OF BLOOMFIELD, NEW JERSEY, ASSIGNOR TO BAKELITE CORPORATION, OF NEW YORK, N. Y., A CORPORATION OF DELAWARE

RESIN SOLUTION AND METHOD OF PREPARING SAME

No Drawing. Application filed May 7, 1927. Serial No. 189,743.

This invention relates to varnishes or analogous resin solutions of which the resin base consists wholly or in part of resins of the thiourea-formaldehyde type. A primary object of the invention is to provide a simple process yielding directly and by a one-stage operation, a solution of a thiourea resin which is potentially reactive in character, that is to say capable of becoming infusible, and practically insoluble in common solvents, upon application of sufficient heat.

Following is a typical and preferred embodiment of the invention, it being understood however that the invention is not limited to the particular proportions of materials, solvents, or manipulations as described:

100 parts by weight of thiourea are dissolved in a mixture consisting of 100 parts each of ethyl lactate and the mono-ethyl ether of ethylene glycol. 60 parts by weight of paraform are added and the mixture heated to its boiling point or somewhat less under a reflux condenser for two to three hours. The resulting solution is filtered and is directly utilizable as a varnish or lacquer. The thiourea in the above example may be partly replaced by urea.

The proportion of solvent used will of course depend upon the particular application or use for which the varnish or resin solution is intended. Such applications include the impregnation of fibrous or other fillers for the manufacture of molding mixtures; the coating or impregnation of sheets of paper or cloth for the manufacture of laminated products; admixture with appropriate solvents or thinners for the preparation of lacquers; and in general the manifold uses for which solutions of reactive resins are adapted in the arts.

The resin solutions prepared as hereindescribed may of course be used in conjunction with other synthetic or natural resins, including the resins of the phenol-methylene type.

I claim:

1. Process of preparing a resin solution comprising effecting a reaction between thiourea and an anhydrous methylene containing hardening agent in the presence of a solvent comprising at least one substance of the group consisting of ethyl lactate and the mono-ethyl ether of ethylene glycol, said hardening agent proportioned to yield a resin of the reactive type.

2. Process of preparing a resin solution comprising effecting a reaction between thiourea and paraform in the presence of a solvent comprising at least one substance of the group consisting of ethyl lactate and the mono-ethyl ether of ethylene glycol, said paraform proportioned to yield a resin of the reactive type.

In testimony whereof, I affix my signature.

JOHN H. SCHMIDT.